(12) United States Patent
Aganovic

(10) Patent No.: US 9,519,727 B2
(45) Date of Patent: Dec. 13, 2016

(54) IMPROVING THE EFFICIENCY OF REAL-TIME WEBSITE OPTIMIZATION PROCESSES USING SALIENCY ANALYSIS

(71) Applicant: Zijad F. Aganovic, Delray Beach, FL (US)

(72) Inventor: Zijad F. Aganovic, Delray Beach, FL (US)

(73) Assignee: Hiconversion, Inc., Boca Raton, FL (US)

( * ) Notice: Subject to any disclaimer, the term of this patent is extended or adjusted under 35 U.S.C. 154(b) by 511 days.

(21) Appl. No.: 13/986,973

(22) Filed: Jun. 20, 2013

(65) Prior Publication Data
US 2014/0380151 A1  Dec. 25, 2014

(51) Int. Cl.
*G06F 17/22*    (2006.01)
*G06F 17/30*    (2006.01)

(52) U.S. Cl.
CPC ............................... *G06F 17/30899* (2013.01)

(58) Field of Classification Search
CPC ................................................ G06F 17/30899
See application file for complete search history.

(56) References Cited

U.S. PATENT DOCUMENTS

| | | | |
|---|---|---|---|
| 8,234,632 B1* | 7/2012 | Hugeback | G06F 11/3495 717/130 |
| 2009/0030859 A1* | 1/2009 | Buchs | G06F 17/30899 706/19 |
| 2013/0166394 A1* | 6/2013 | Churchill | G06Q 30/0276 705/14.72 |

* cited by examiner

*Primary Examiner* — Asher Kells
(74) *Attorney, Agent, or Firm* — Gregory P. Gadson

(57) ABSTRACT

In order to improve the efficiency of website optimization processes a novel pre-processing method at least includes: a) receiving website source code or web browser code from a website to be optimized; b) converting the website source code or web browser code into an electronic image; c) mapping web page elements corresponding to areas in the image; d) performing saliency analysis on the image; e) mapping the results of the saliency analysis to the web page elements; and f) selecting at least one web page for inclusion in a website optimization process based on the saliency analysis. A corresponding novel system is also disclosed.

9 Claims, 11 Drawing Sheets

IMPROVING THE EFFICIENCY OF REAL-TIME WEBSITE OPTIMIZATION PROCESSES USING SALIENCY ANALYSIS

BACKGROUND OF THE INVENTION

1. Field of the Invention

The present invention relates to schemes for automatically and intelligently reducing the amount of resources, time and experiments needed to present optimized websites to website visitors for maximum conversion rates.

2. Background

In the new digital economy it is often imperative that business entities have a website presence on the World Wide Web. However, having a website alone without careful, dynamic attention to its effectiveness does not guarantee meaningful success. While website related success may have different meanings, any evaluation of success is likely to take into account the "conversion rates" associated with the particular website. Conversion rates may be broadly defined as the rates in which visitors to websites engage in desired business activity during or as a result of visiting websites. The desired activities are defined by the website operator, but generally range from completing sales, making orders, viewing targeted advertisement, agreeing to be a subscriber, agreeing to receive future advertisement, participating in surveys, and many more.

Websites therefore need to be optimized to maximize associated conversion rates. Website optimization is a complex undertaking ideally bringing together several disciplines, including computer science, marketing, advertising, and psychology. Since a web page can have several elements, that each have several possibilities, and that the arrangement of the elements can have several possibilities, and that there can be several permutations and combinations of different elements, there can literally be millions of possible variations for the web page in question.

The challenge is therefore to present web pages to website visitors that will maximize conversion rates, a difficult enough task, when simply initially optimizing a website, which is made more daunting by the need to dynamically optimize a website in response to changes which may dynamically impact the economic and social behaviors of website visitors.

Website visitation experiences can be audio-visual, but have a strong visual aspect. Neuroscientific influences determine how a visitor will react to a particular web page or group of web pages, including visceral or "bottom-up" stimuli, and the more intellectual or "top-down" stimuli, and what actions the visitor might take. Much like scarce resources associated with macroeconomics, the perceptual and cognitive resources of animals like humans are also limited, causing humans to utilize important coping mechanisms for sensory overload and decision-making.

A well-designed website implicitly takes advantage of both bottom-up and top-down influences for achieving high conversion rates, although the prior art approaches to website optimization do not address these influences, and are heuristic approaches. Website optimization can rely entirely on the experience of consultants and designers who apply their rich empirical knowledge to produce a website expected to have a high conversion rate. Such an approach, however, is a subjective one that yields results that are not likely valid for actual, sustained use. What is successful for one website owner may not be successful for another website owner. Additionally, even when a newly designed website appears to have higher conversion rates than a previous version, such approaches lack empirical evidence that maximum conversion rates have been reached.

Other approaches include applying scientific methods of measuring website conversion, and running experiments for the purpose of finding a version of the website that has the highest conversion rate. The most effective of those methods is the multivariable (or "multivariate") testing method, where multiple elements of the web page are varied at the same time, and data is collected from the actions of visitors who participate in the testing. This approach is offered by companies such as Google, Memetrics, Optimost LLC, SiteSpect, Offermatica, and Hiconversion, Inc. The latter company, the assignee of the present application for Letters Patent, is also the assignee of U.S. patent application Ser. No. 11/880,823 by inventors Francois Buchs, et al. directed to "Method and Apparatus for Real-time Website Optimization," which is hereby incorporated by reference.

While it would be ideal to test all web page permutations in an optimization experiment, or a full factorial approach, the time, resources, and the number of website visitors who may be inconvenienced makes full factorial optimization approaches impractical. Therefore, fractional factorial approaches are typically used, where only a subset of page variations is tested and the best solution is found or statistically predicted based on those limited results.

In addition to the website optimization approaches of the Buchs, et al. patent application identified supra, which is a closed loop system (i.e., with feedback), several other optimization approaches have been used, including but not limited to the following. For example, U.S. Pat. No. 6,934,748 to Louviere, et al. discloses an automated open loop (i.e., no feedback) system for experimentation that includes an experiment engine which defines experiments relating to various treatments for a set of content elements. U.S. Patent Application Number 20040123247 by Wachen discloses a method and apparatus for altering electronic content that includes a template for assigning variables and values to a section of the content, a generator that creates the permutations of the content, a transmitter that provides the content to a requestor, and an evaluator and optimizer that aids in selecting the most optimal permutation of the content.

U.S. Patent Application Number 20060271671 by Hansen, discloses a method and system for optimizing web visitor conversion using a reverse proxy server to introduce page variations on existing website content without the need to modify the existing target server.

U.S. Patent Application Number 20030014304 by Calvert, et al., discloses a method for evaluating Internet advertisement effectiveness that involves collecting Internet activity information associated with a multitude of "cookies." U.S. Pat. No. 5,968,125 to Garrick, et al. discloses a process for determining the effectiveness of a web page to a visitor by creating alternative and test web pages, sending requests to the test web page, monitoring the use of the web page and the rate that the web page objective was met, and replacing pages with the page most visited. U.S. Patent Application Number 20020042738 by Srinivasan, et al., discloses a method and system for measuring the effectiveness of the layout or appearance of a website advertisement to a visitor, wherein different visitors are shown different formats of the same page, response to the page is monitored, and statistics are analyzed regarding the responses.

U.S. Patent Application Number 20030018501 by Shan, discloses a method and system for processing test data relevant to specific behavior of visitors to a website. U.S. Pat. No. 6,662,215 to Moskowitz, et al., discloses a system and method for determining appropriate website content for consumers comprising a server arrangement, including a "real time content optimization" server, a user computer, and a network, wherein upon request a web page is generated for the user having static and dynamic elements which are tested for user reaction and response.

Regardless of the optimization approach, there is a long-felt, but unsolved need to reduce the number of web page versions that are included in optimization experiments, while not sacrificing the validity of the test results because fewer web pages have been used. This will greatly reduce the time and computation resources needed, and reduce the number of website visitors who will need to participate in website optimization experiments.

Thus, the formal use of saliency as an off-line pre-processing tool for making website optimization experiments more efficient has never been taught or suggested by the prior art. The use of saliency, for example, in prior art computing applications has been limited mostly to robotic and pattern recognition applications in general, or in the case of U.S. Patent Application Number 20060070026 by Balinsky, et al., for printed document design. In the main embodiment a user generates a draft document and creates a saliency map there from which rates regions of the draft document according to the saliency of that region, performs a comparison of the saliency of one or more predetermined regions against a relevancy rating for that region and alters one or more document parameters associated with the draft document if the comparison shows that one or more of the predetermined regions has a saliency that does not match that required by the relevancy data for that region.

Another use of saliency in computing applications include U.S. Patent Application Numbers 20020154833 and 20020154833 by Koch, at al., which disclose methods and systems for computation of intrinsic perceptual saliency in visual environments, and applications. The image is analyzed at multiple spatial scales and over multiple feature channels to determine the likely salience of different portions of the image. One application for the system is in an advertising context.

Saliency may be defined as any aspect of a stimulus that makes the stimulus stand out from among other ambient stimuli, and may include so-called "bottom-up," memory-free reactions, and so-called "top-down," memory-dependent or anticipatory mechanisms (such as pricing and quantity information, brand names, and descriptions).

SUMMARY OF THE INVENTION

In view of the aforementioned problems and deficiencies of the prior art, the present invention provides a novel pre-processing method that at least includes: a) receiving website source code or web browser code from a website to be optimized; b) converting the website source code or web browser code into an electronic image; c) mapping web page elements corresponding to areas in the image; d) performing saliency analysis on the image; e) mapping the results of the saliency analysis to the web page elements; and f) selecting at least one web page for inclusion in a website optimization process based on the saliency analysis.

The present invention also provides a novel pre-processing system adapted for use with website optimization that at least includes: a) a website server adapted to receive website source code or web browser code from a website to be optimized; b) a web page image converter adapted to convert the website source code or web browser code into an electronic image; c) a code to image mapper adapted to map web page elements corresponding to areas in the image; d) a saliency computation module adapted to perform saliency analysis on the image; e) a saliency to code mapper adapted to map the results of the saliency analysis to the web page elements; and f) a saliency filter adapted to select at least one web page for inclusion in a website optimization process based on the saliency analysis.

The present-inventive saliency method and system are ideally operated off-line, and serve to greatly reduce the time, resources and number of experiments needed to optimize websites (i.e., modify the web pages to maximize conversion rates). The present invention is operational with a wide variety of optimization methods, which optimization methods are a matter of design choice.

Additional objectives and advantages of the invention will be further explained in the description that follows.

BRIEF DESCRIPTION OF THE DRAWING FIGURES

Features and advantages of the present invention will become apparent to those skilled in the art from the description below, with reference to the following drawing figures, in which.

Figure 4:
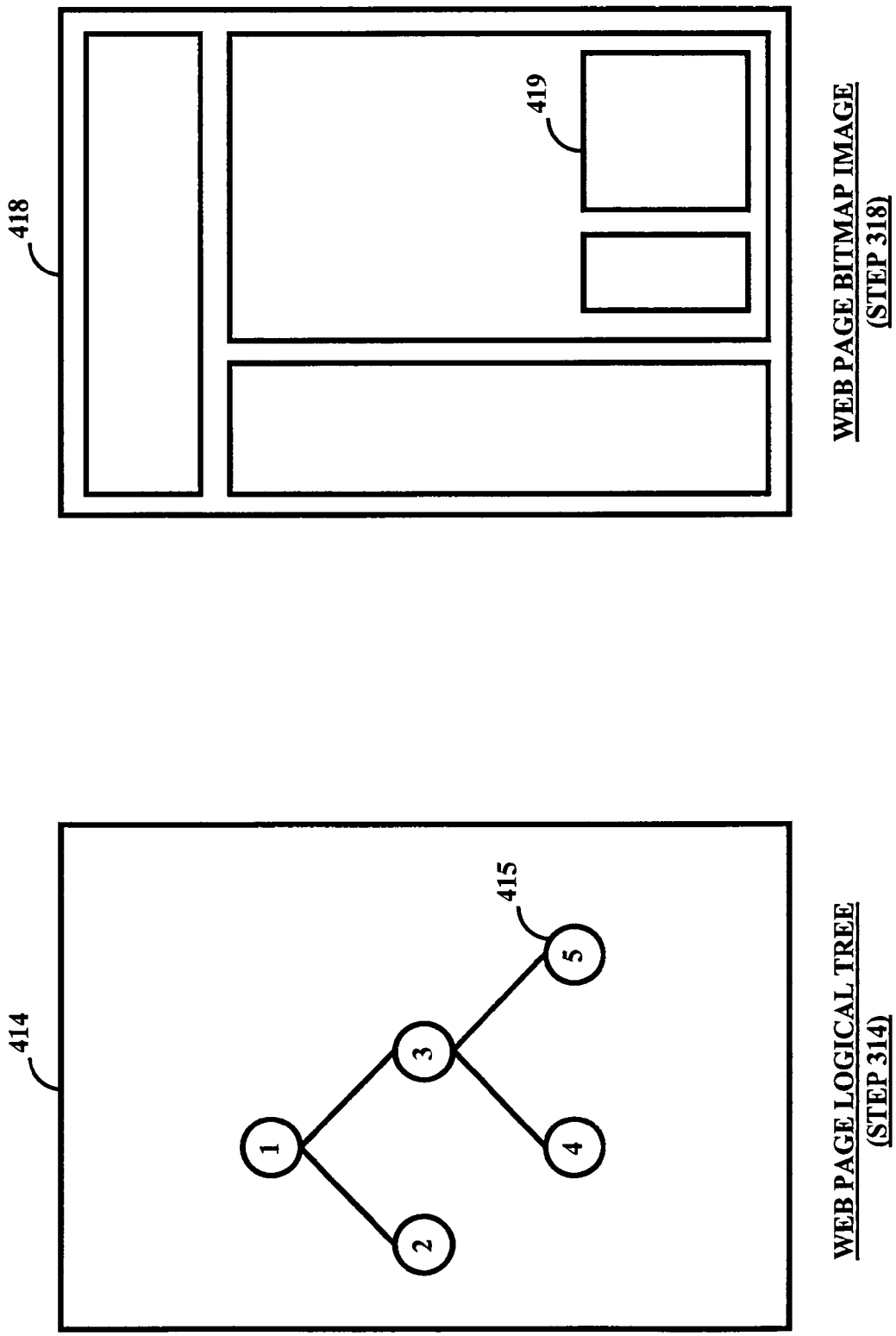
Figure 5:
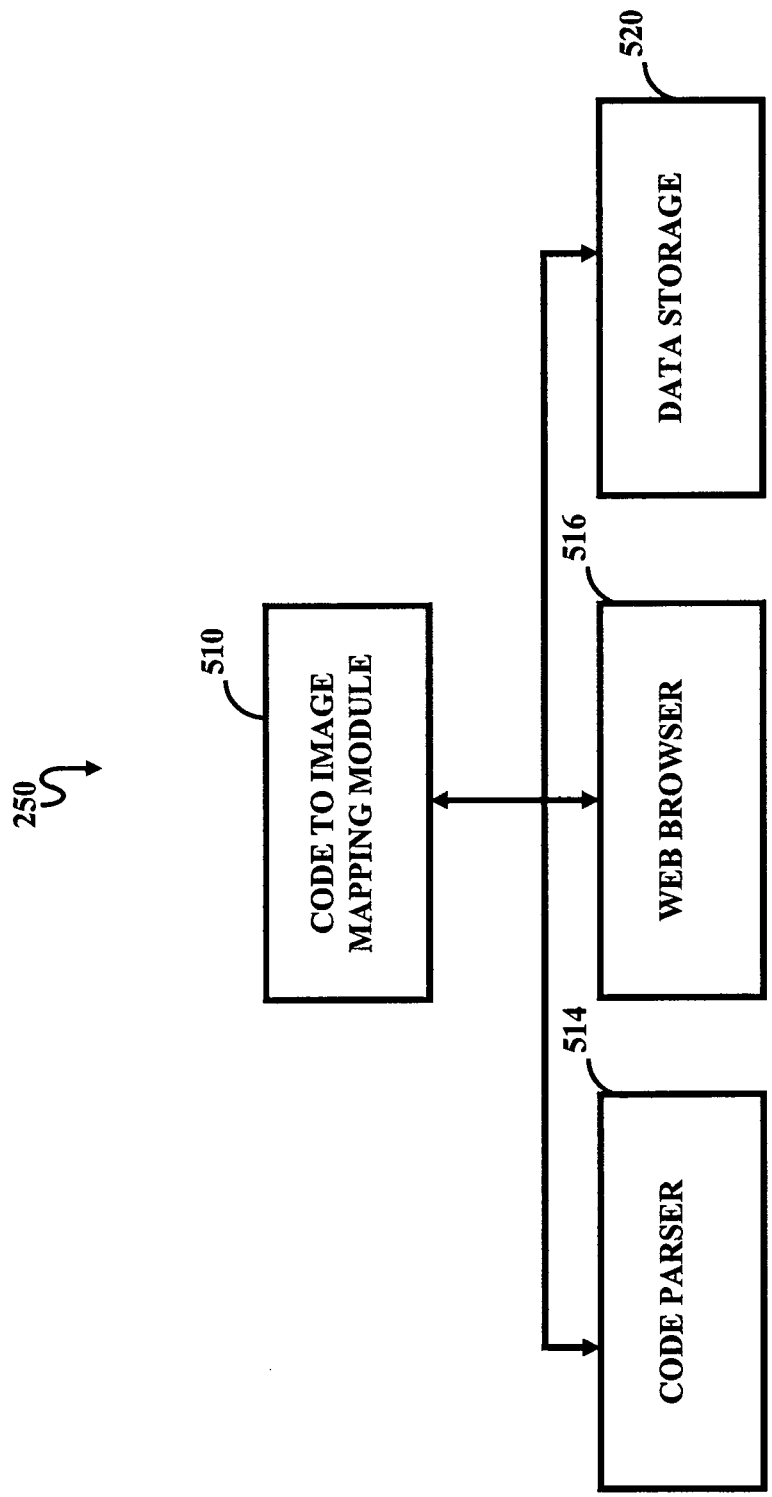
Figure 6:
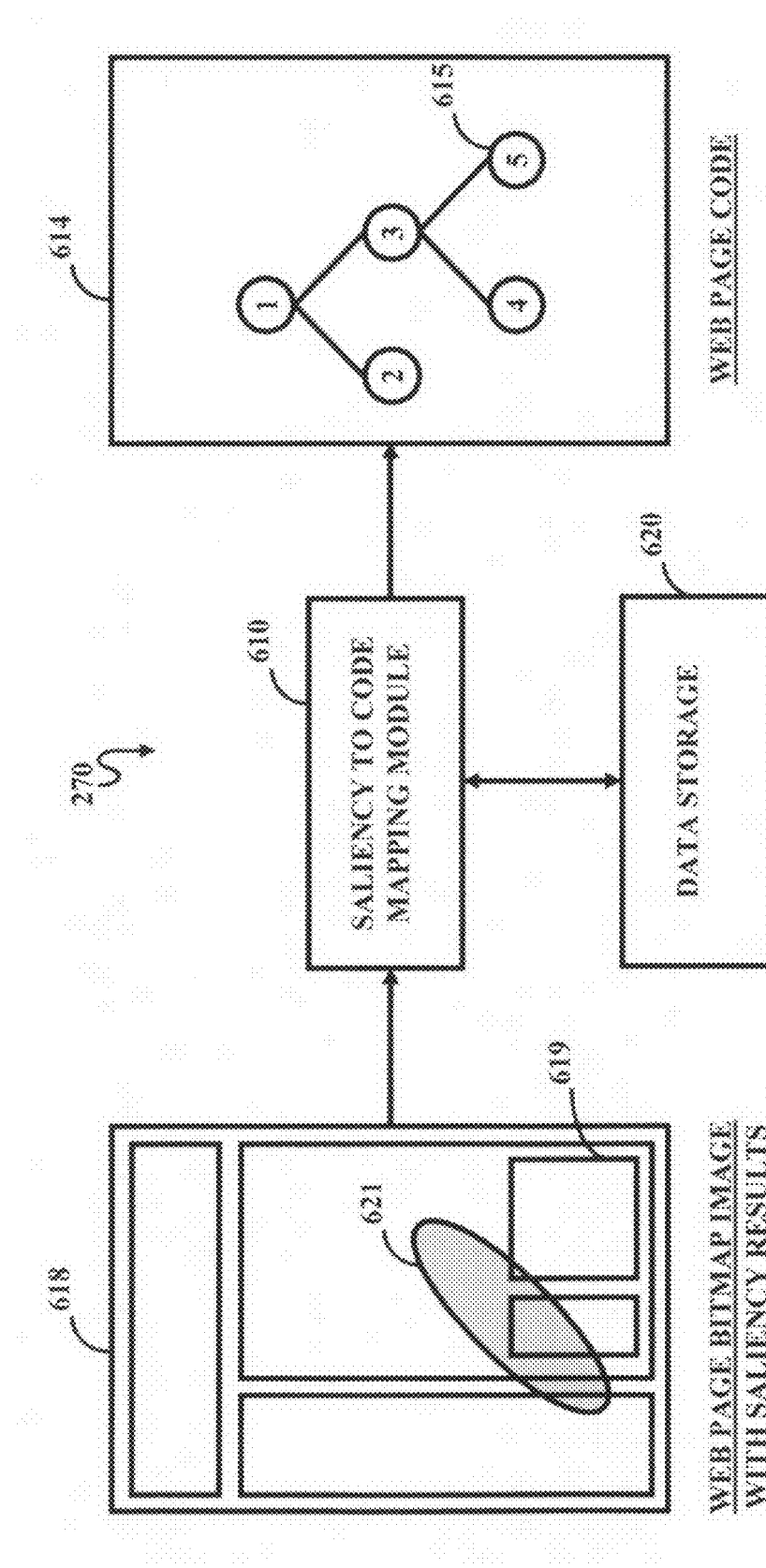
Figure 7:
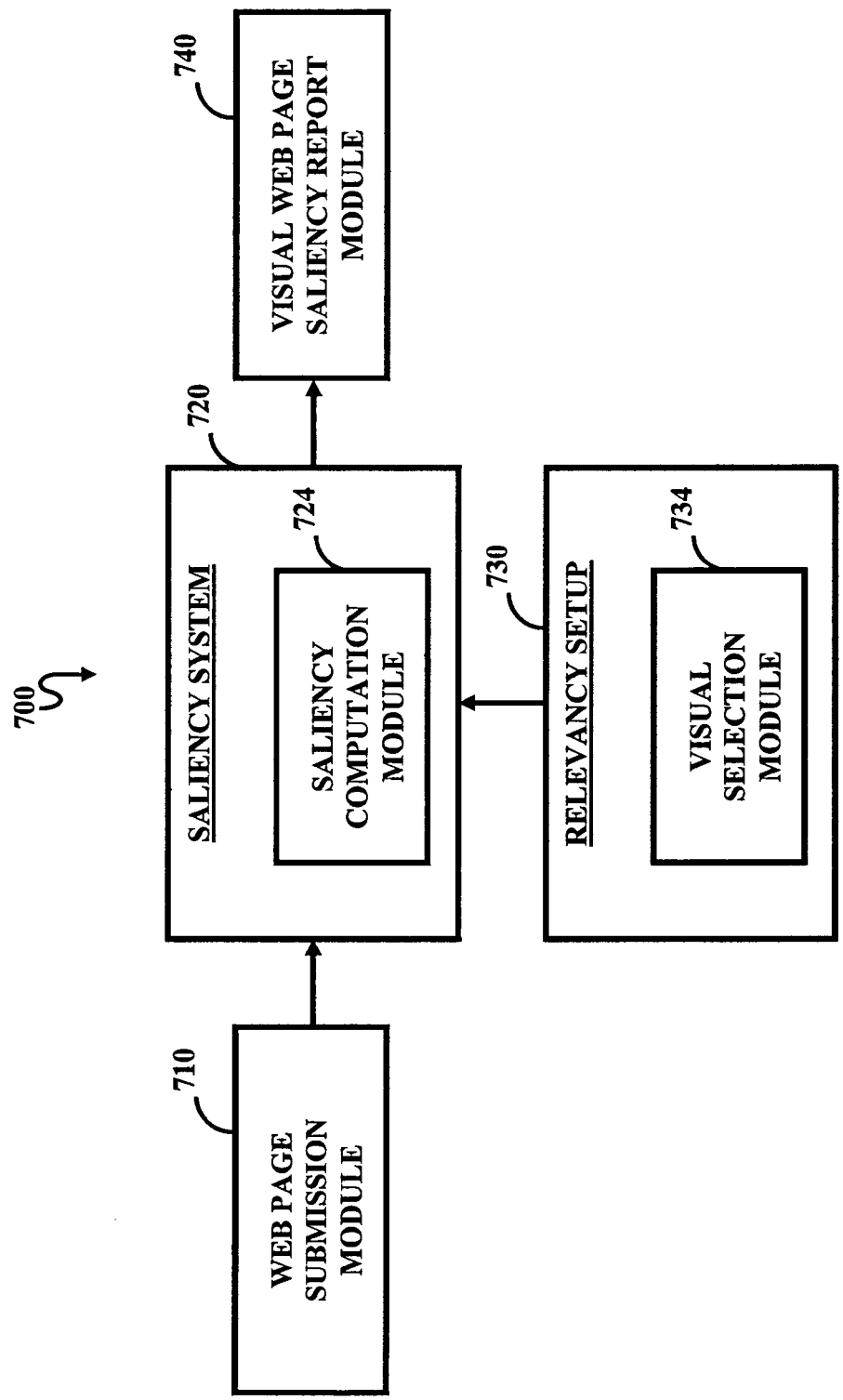
Figure 8:
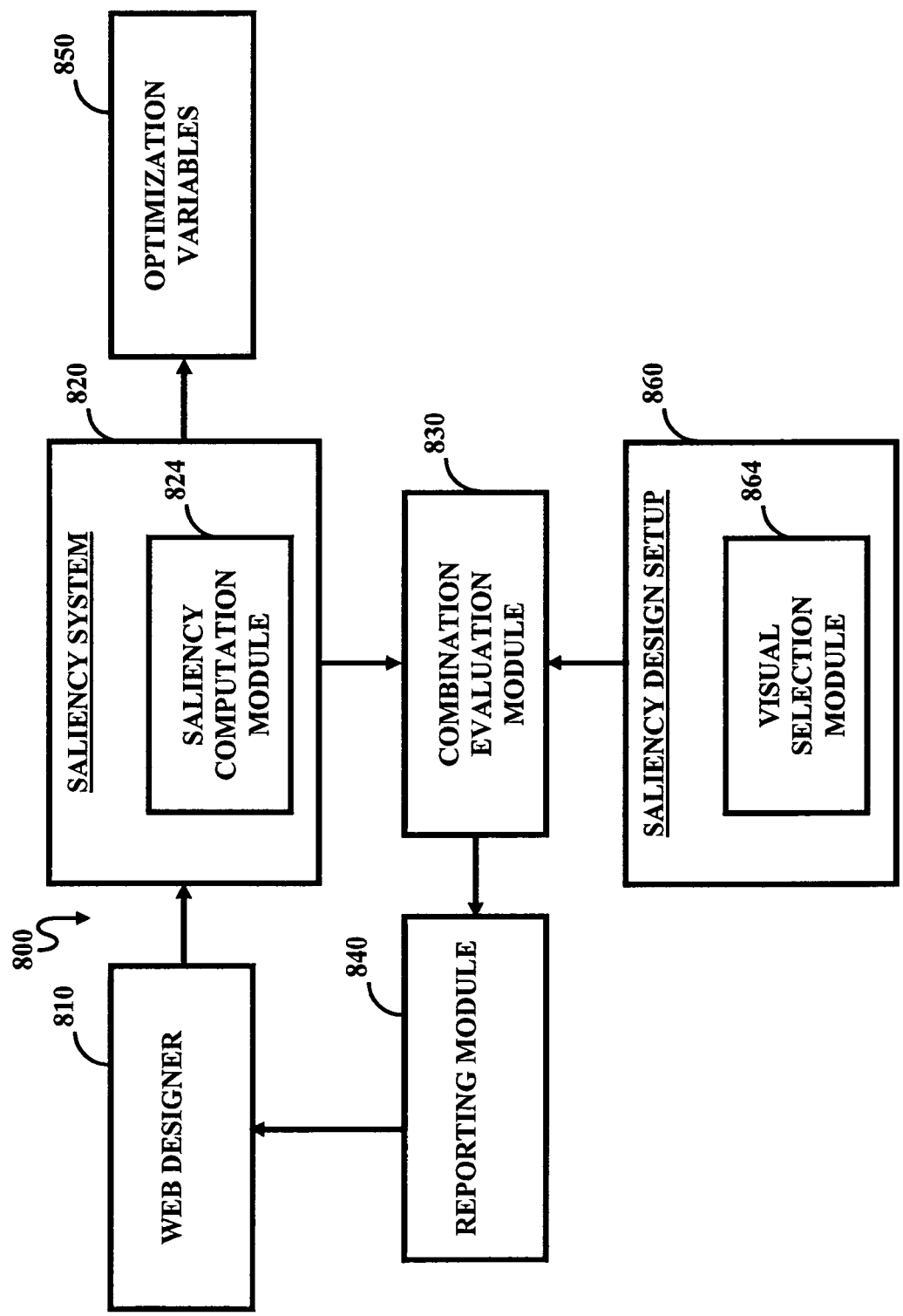
Figure 9:
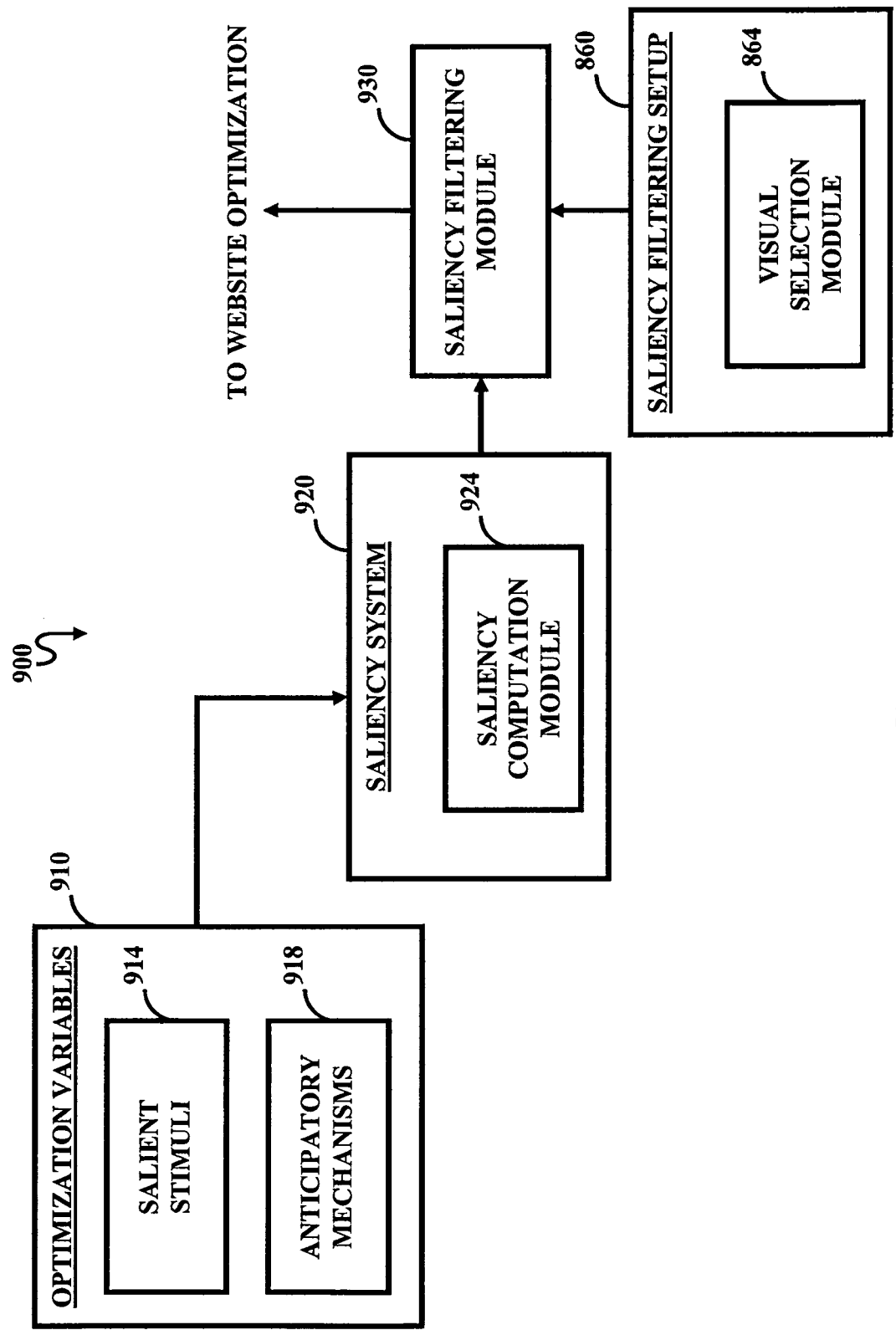
Figure 10:
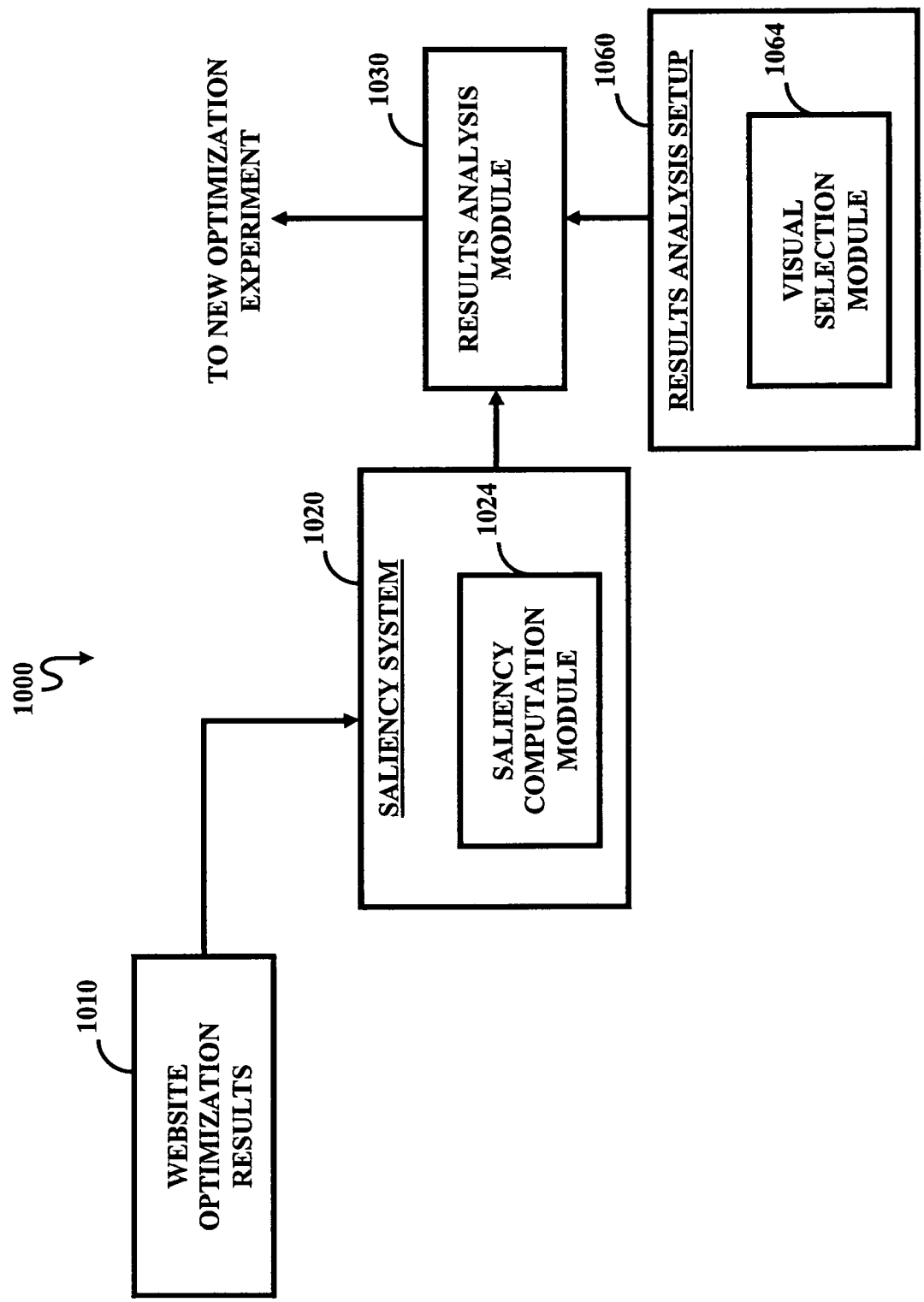
Figure 11:
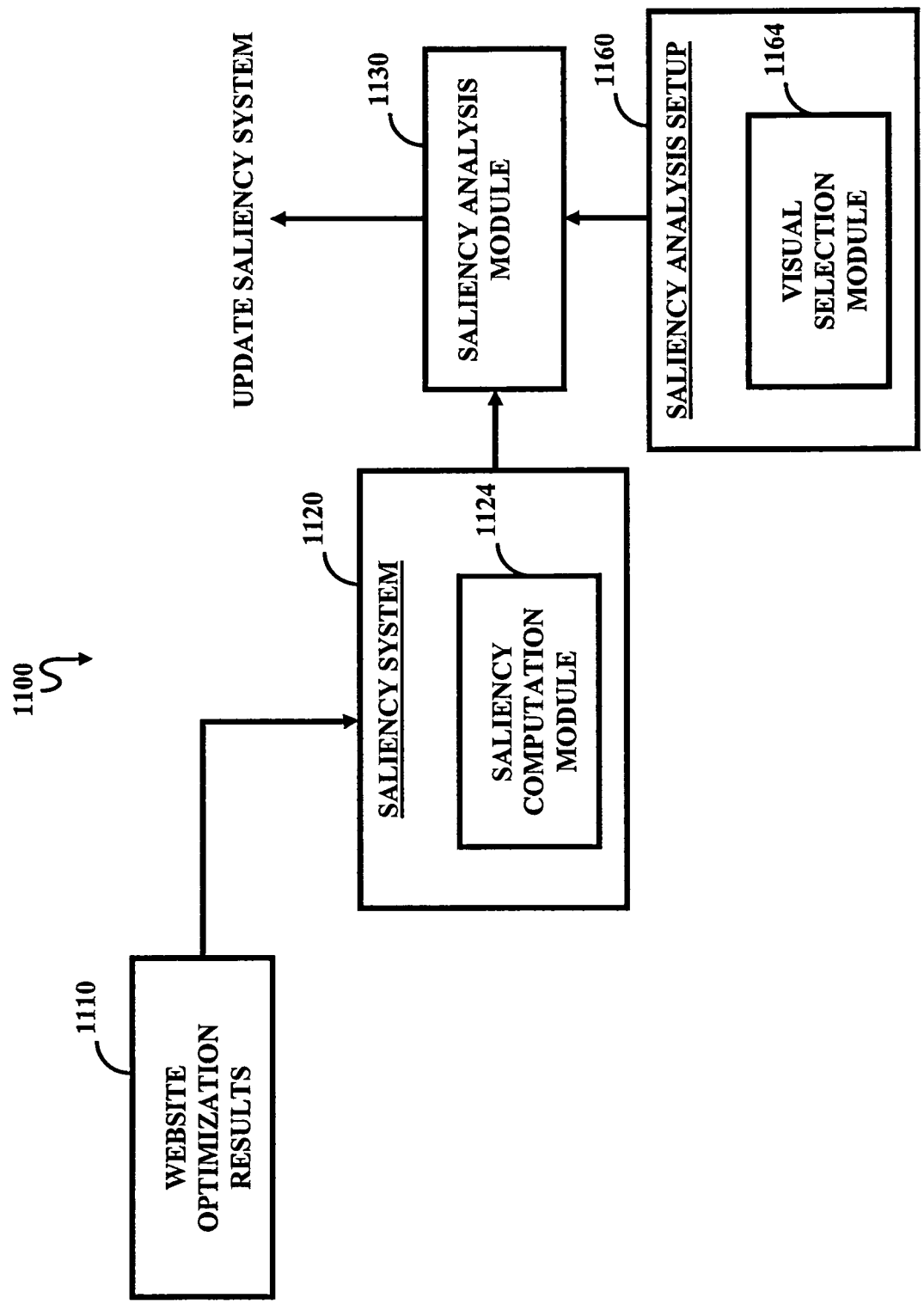

FIG. 4 contains diagrams further depicting the mapping of website source code or end-user browser code and web page image files according to the present invention;

FIG. 5 is a schematic diagram illustrating the code-to-image mapping function according to the present invention;

FIG. 6 is a schematic diagram illustrating the saliency-to-code mapping function according to the present invention;

FIG. 7 is a schematic diagram illustrating the web page saliency diagnosis function according to the present invention;

FIG. 8 is a schematic diagram illustrating the use of saliency in the experimental preparation phase of website optimization according to the present invention;

FIG. 9 is a schematic diagram illustrating the use of saliency as a filtering mechanism to reduce prospective web page permutations according to the present invention;

FIG. 10 is a schematic diagram illustrating the use of saliency during the results analysis aspect of website optimization according to the present invention; and FIG. 11 is a schematic diagram illustrating automatic updating of the saliency computation system according to the present invention.

DESCRIPTION OF THE PREFERRED EMBODIMENTS

Figure 1:
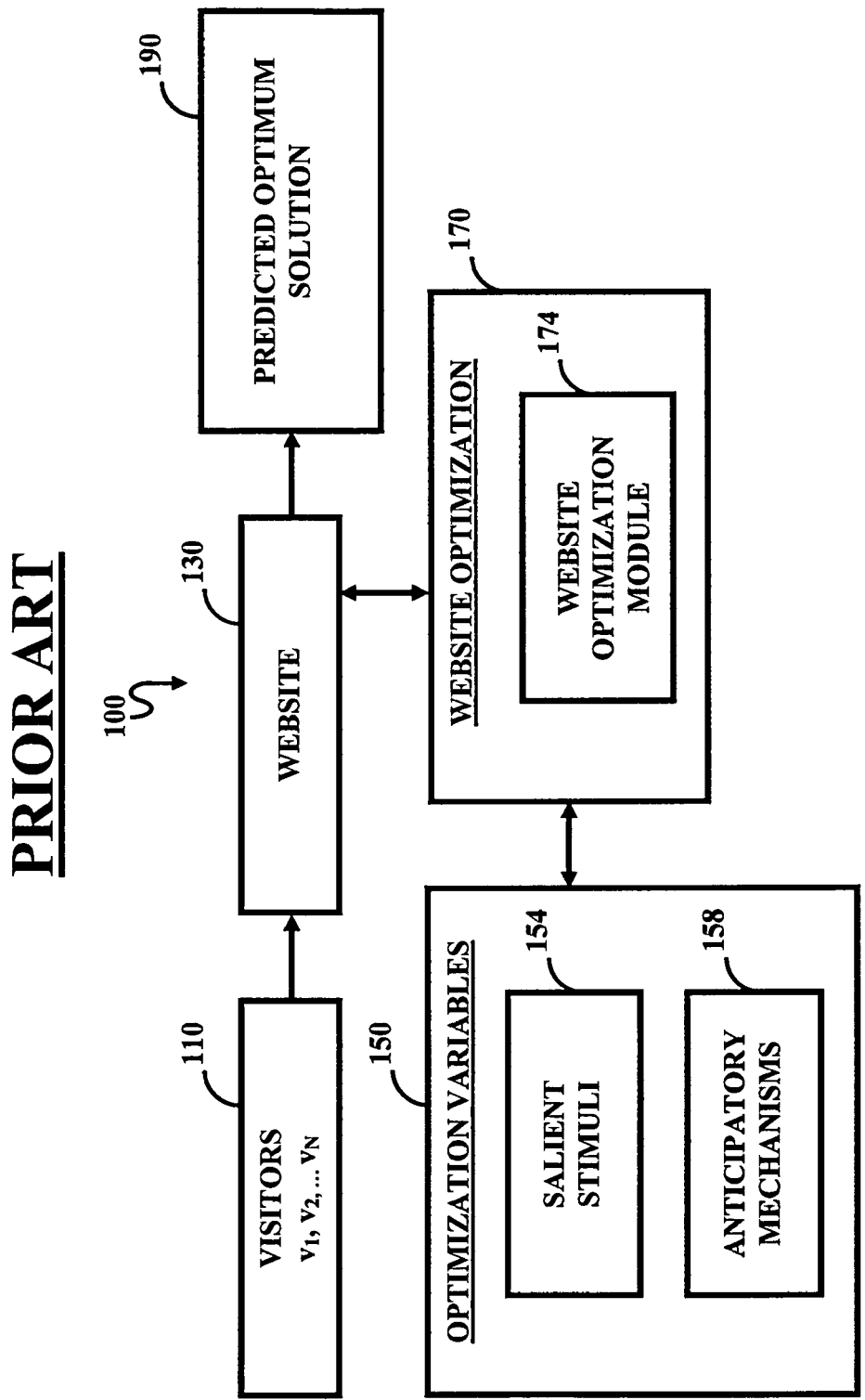
FIG. 1 is a schematic diagram of a prior art process for generalized website optimization.

FIG. 1 illustrates a prior art system 100 capable of website optimization. The website optimization system 100 nominally includes a website 130 to be optimized, and a symbolic representation 110 of visitors to the website in question. A website optimization solution 170 contains a website optimization module 174 for automatically testing optimization variables supplied by the unit 150. The components operate during optimization testing to predict an optimum solution 190 which aspires to correlate to the maximum conversion rate. The optimization variables contain both salient stimuli 154 (i.e., indicative of the look and feel) and anticipatory mechanisms 158 (e.g., top-down factors such as messaging, price, quantity and company logos).

Figure 2:
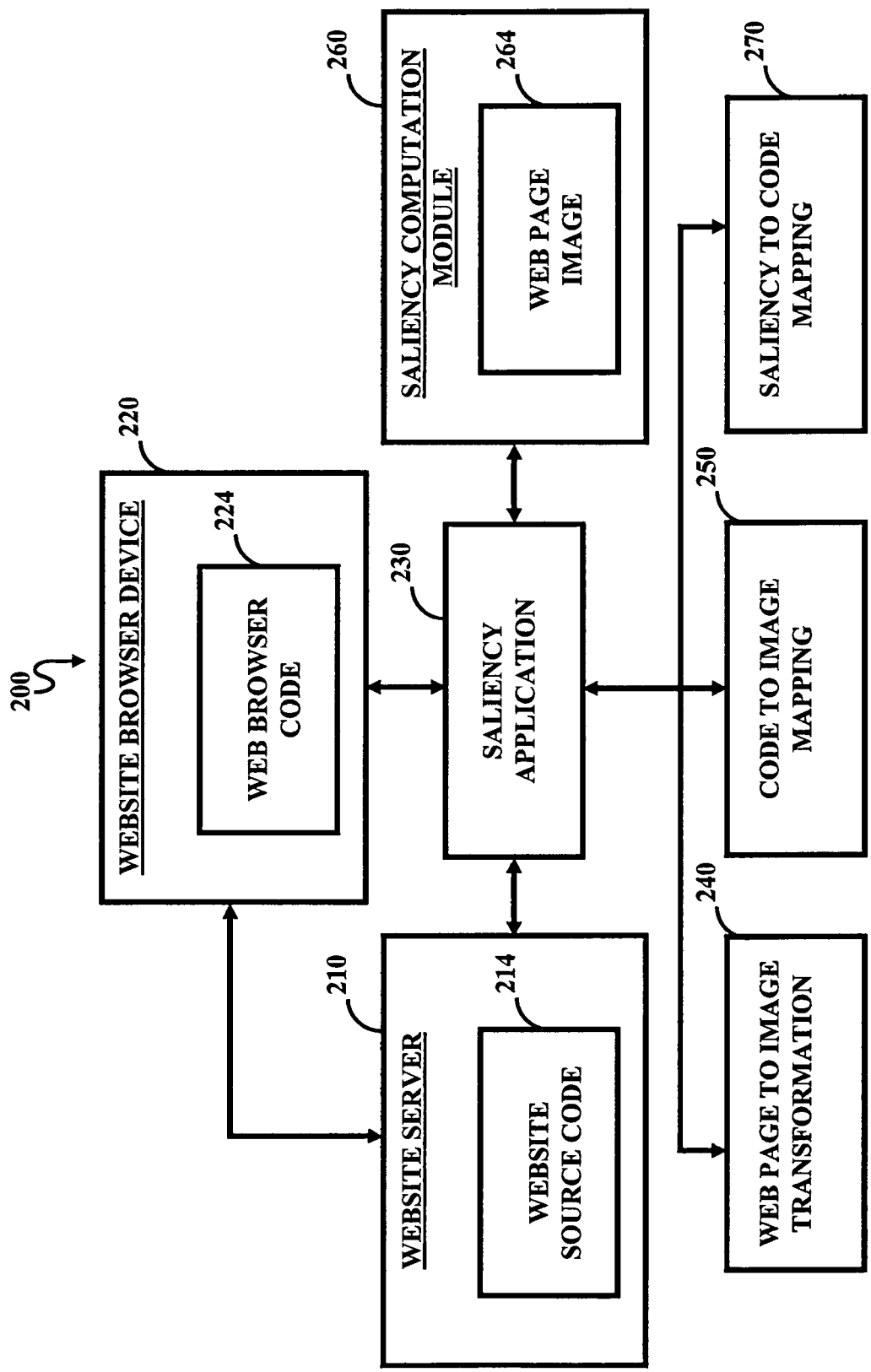
FIG. 2 is a schematic diagram of a system capable of website optimization utilizing saliency according to the present invention.

To address the limitations of prior art optimization methods and systems, the present invention novelly employs pre-processing using saliency to reduce the size of the search space needed and the time of experimental testing required, as well as the number of website visitors that need to participate in the optimization testing. Referring to FIG. 2, the system for website optimization pre-processing 200 utilizes saliency measurement and analysis to reduce the number of web pages needed for valid optimization testing. A web page is viewed via a website browser device 220, which contains a web browser code module 224 for rendering website source code from the website source code module 214 of a website server 210. Those skilled in the art will appreciate that the web browser code module 224 transforms the website source code into code readable by a web browser (i.e., web browser code).

A saliency application module 230 manages the overall interaction between components that carry out the saliency solution, as will be described infra. The saliency application module 230 can utilize either browser code or website source code, and can further directly interact with web browser devices or external computer programs to either accept saliency provisioning parameters (input by an end-user or end-user program) or represent web page saliency results. The saliency application module 230 also manages a web page to image transformation module (or image converter or image transformer) 240 that transforms a web page into an electronic image file suitable for use in saliency analysis. Further, the saliency application module 230 manages a code to image mapping module (or image mapper) 250 that maps components of the website source code (or end user browser code in the alternative) to corresponding areas of the web page image generated by the page to image transformation module 240, and vice versa.

A saliency computation module 260 processes the web page image 264 according to a saliency algorithm and predefined user-controlled parameters. A saliency to code mapping module (or saliency to code mapper) 270 maps the saliency process results from the saliency computation module 260 back to the web page source code components. As a result of the operation of the system 200, web page source code is pre pre-processed using saliency analysis.

Figure 3:
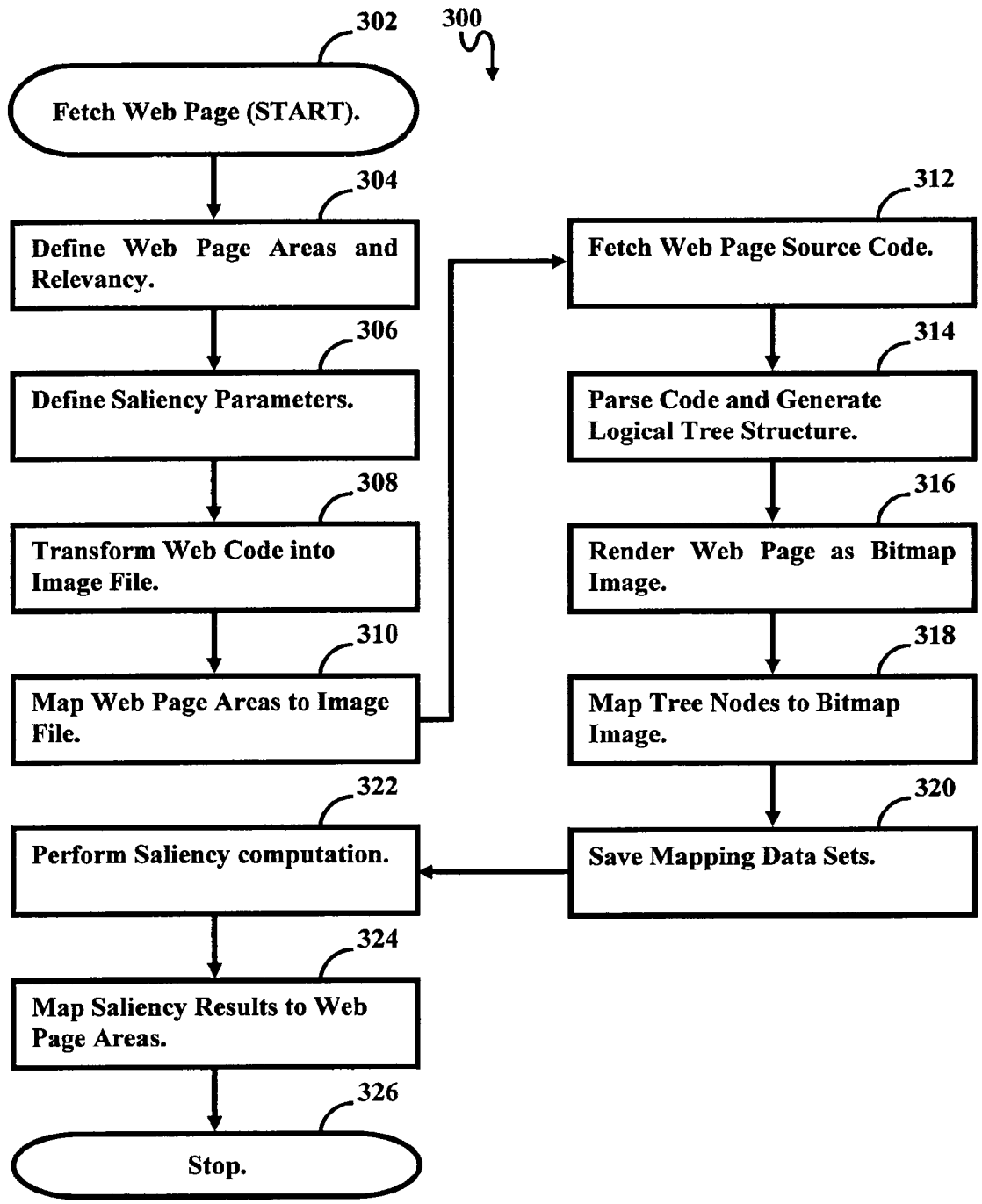
FIG. 3 is a flowchart illustrating the steps carried out by the method of website optimization utilizing saliency according to the present invention.

The present-inventive method for website optimization pre-processing using saliency measurement and analysis is illustrated by the flowchart 300 in FIG. 3. The process begins by fetching a web page to be analyzed (Step 302). Either the website source code or web browser code (i.e. the code delivered by web server to a web browser) is compatible with the present invention. In the preferred embodiment Step 304 performs the task of enabling an end-user or other external computer program to identify areas of a web page that are relevant to conversion rates, and receives assigned relevancy factors for the areas (from the end-user or computer program). Next, the method receives saliency parameters in Step 306 from the end-user or external computer program. These parameters define how saliency analysis of the web page will be performed, including for example, the delay between presenting an image to a website visitor participating in a test and the onset of calculating saliency results.

In Step 308, the method transforms or converts the website source code (or web browser code) into a bitmap electronic image file version of the web page, which is conducive to saliency analysis. Step 310 maps the areas of the web page to the image created in Step 308. The mapping function which began at Step 310 involves several additional steps (312 through 320) before the method advances to Step 322, where saliency computation is performed.

The web page source code (or browser code) is fetched in Step 312. Those skilled in the art to which the present invention pertains will appreciate that web page codes have a file system that contains many files and many file types distributed among many different file folders. Hence, Step 314 the relevant file system is parsed, and a logical tree structure is generated with each node of the tree corresponding to a physical component of the web page code, like a table cell, or an image of a "submit" button, for example. Step 314 is also explained using as a reference, the web page logical tree 414 shown in FIG. 4. In that Figure, reference number 415 denotes a node of the logical tree.

Step 316 presents the previously-generated bitmap image for the next step (318), which obtains the Cartesian coordinates of the tree nodes rendered in the web page bitmap image. For example, tree node 415 corresponds to a bitmap image section 419 of a web page bitmap image 418, as further illustrated in FIG. 4. In Step 320 the mapping data acquired in Step 318 is saved for use in saliency analysis.

In Step 322 the method performs saliency computations on the image in accordance with the provisioning information generated in Step 306, or according to default parameters if no information has been generated in Step 306 (or in an alternate embodiment which does not include Step 306). In Step 324 the method maps saliency computation results back to the corresponding web page areas.

The mapping steps (i.e., elements of code representing web page areas to image coordinates, and saliency results back to the code elements) of the present invention are critical to the use of saliency website optimization solutions. The system for mapping saliency results back to web page areas is further described with reference to FIG. 5.

The code to image mapping module 250, first introduced in FIG. 2, is illustrated in more detail in FIG. 5. A code to image mapping module (or code to image mapper) 510 acquires web page code and submits the code to a code parser 514 that parses and processes web page code, and further generates the aforementioned logical tree structure. A web browser 516 renders the web page image and fetches the coordinates of each logical tree node. The mapping data generated by code to image mapping module is stored for later use via data storage 520.

The saliency to code mapping module (or saliency to code mapper) 270, first introduced in FIG. 2, is illustrated in more detail in FIG. 6. In the example of FIG. 6, a web page bitmap image 618 with saliency contains only one high saliency area 621. This area has a shape that overlaps with multiple web page components. A saliency to code mapping module (or saliency to code mapper) 610 utilizes saved code to image mapping data from data storage 620 to perform saliency calculations that will assign saliency results back to the elements of the web page code represented by the number 614. The saliency to code mapping module 610 is capable of utilizing many different algorithms to determine the impact of saliency areas on the individual image sections that correspond to web page elements. For example, the saliency of the section 619 can be calculated as the size of the intersections between this section and the saliency area 621. As result, the saliency mapping subsystem in FIG. 6 assigns the saliency of the section 619 to its corresponding web page element 615.

FIG. 7 illustrates a web page diagnosis system 700 compatible with the present invention, and used to diagnose saliency of the live web page. For example, the system 700 might be used as marketing tool which will stimulate businesses to pursue website optimization. The existing live web page under consideration is delivered via a web page submission module 710 to a saliency system component (as was previously described in connection with FIG. 2) that contains a saliency computation module 724 which analyzes the saliency of the web page in question. A relevancy setup module 730 contains, inter alia, a visual selection module 734 which enables user-driven visual selection and relevancy rating of the most important areas of the website. After a comparison between user-defined areas and their relevancy against actual saliency results, if any, a visual web page saliency reporting module (or visual web page saliency reporter) 740 delivers the results to the user.

It is expected that the aforementioned reports will show desired results (of user defined relevancy of the area) that vary significantly from actual results (saliency factor of the area), prompting website owners to recognize the importance of website optimization and the need for better solutions.

Turning to FIG. 8, an experiment design system 800 according to the present invention is illustrated for the pre-processing of web pages for website optimization. A web designer symbolically represented by number 810 can utilize saliency in the experiment preparation phase of a website optimization implementation process, and perform interactive web page design work in combination with saliency computation in order to produce optimization variables 850. The optimization variables produced according to the saliency criteria used will minimize the number of web page permutations that will be needed for testing during the subsequent website optimization experiment.

A saliency system component 820 containing a saliency computation module 824 (as described in connection with FIG. 2) performs saliency computations, while a combination evaluation module (or combination evaluator) 830 eliminates web page combinations that do not satisfy design expectations. A reporting module 840 presents saliency results in a user-readable form.

In the preferred embodiment, the experiment design system 800 also includes a saliency design setup component 860 which contains a visual selection module (or visual selector) that enables user-driven visual selection and relevancy ratings of the most important areas of the website. This capability in combination with the web page combination evaluation module 830 allows for further automation of the optimization experiment design process.

Further in accordance with the present invention, a saliency filtering system 900 is schematically illustrated in FIG. 9. The system 900 automatically filters of optimization variables 910 that are to be presented for optimization experiments. The optimization variables contain salient stimuli 914 and anticipatory mechanisms 918, as previously discussed. A saliency system component 920 utilizing its saliency computation module 924 determines the saliency of the web page combinations that can be generated from the optimization variables. A saliency filtering module filters out optimization variables or web page combinations that do not satisfy preselected saliency criteria.

The preferred embodiment of the saliency filtering system 900 also includes a saliency filtering setup component 860 containing a visual selection module (or visual selector) 864 allowing a user-driven visual selection and relevancy rating of the most important areas of the website. This capability in combination with appropriate saliency filtering module algorithm allows for further enhancement to the saliency filtering capability. Used off-line without the need of web traffic, saliency filtering reduces the number of web page combinations that need to be tested with live website visitors.

Further in accordance with the present invention, a results analysis system 1000 for automatically analyzing website optimization data (1010) is schematically illustrated in FIG. 10. A saliency system component 1020 containing a saliency computation module 1024 (the likes of which have been previously described) determines the saliency of web page combinations in question and evaluates the combinations for predicted top performers and worst performers. A results analysis module (or results analyzer) 1030 analyzes the website optimization results, and that analysis is used as input for the creation of a new (and presumably better or more relevant) website optimization experiment.

The preferred embodiment of the results analysis system 1000 also includes a results analysis setup component 1060 containing a visual selection module (or visual selector) 1064 for the user-driven selection and relevancy rating of the most important areas of the website.

Also in accordance with the present invention is a saliency analysis system 1100, which is schematically illustrated in FIG. 11. The saliency analysis system 1100 provides for automated improvements in saliency-based pre-processing for website optimization. A saliency system component 1120 containing a saliency computation module 1124 (previously generally described in connection with earlier drawing figures) uses website optimization results collected during the website optimization experiment to determine the saliency of the website optimization results. A saliency analysis module (or saliency analyzer) 1130 discrepancies between expected saliency results (based on the current saliency computation model) and actual results collected during the optimization test. For example, it is possible that the same content presented in two visual forms might produce results that are opposite to what the existing saliency analysis model predicts.

The preferred embodiment of the saliency analysis system 1100 also includes a saliency analysis setup component 1160 containing a visual selection module (or visual selector) 1164 for the user-driven selection and relevancy rating of the most important areas of the website.

Using the discrepancy data generated, the saliency analysis module 1130 can suggest refinements in the saliency system that can either be implemented by the choice of the end user, or automatically implemented in an alternate embodiment.

Variations and modifications of the present invention are possible, given the above description. However, all variations and modifications which are obvious to those skilled in the art to which the present invention pertains are considered to be within the scope of the protection granted by this Letters Patent.

What is claimed is:

1. A method of pre-processing for website optimization comprising:
   a) receiving website source code or web browser code from a website to be optimized;
   b) converting said website source code or web browser code into an electronic image comprising a bitmap;
   c) mapping web page elements corresponding to areas in said image mapping nodes of the logical tree to corresponding areas of said bitmap image;
   d) performing saliency analysis on the said image;

e) mapping the results of said saliency analysis to said web page elements;

f) selecting at least one web page for inclusion in a website optimization process based on said saliency analysis;

g) parsing the code of element b);

h) generating a web page logical tree from the code of element b); and i) mapping nodes of the logical tree to corresponding areas of said bitmap image.

2. The method of claim 1, further comprising:

generating optimization variables to be utilized in the website optimization process.

3. The method of claim 1, wherein element f) further comprises:

eliminating from consideration in the website optimization process, web pages containing web page element combinations which are contrary to predefined saliency expectations or website optimization variables that are contrary to predefined saliency expectations.

4. The method of claim 1, further comprising:

receiving website optimization process results;

performing secondary saliency analysis on said website optimization process results; and supplying the results of said secondary saliency analysis for a new website optimization process.

5. The method of claim 1, further comprising:

allocating a saliency result area to a specific section of a web page image according to a predefined mapping rules and according to the overlap of the saliency result area with respect to the specific section; and mapping the saliency of the specific section to a corresponding element of the web page or web browser code.

6. The method of claim 1, wherein the elements are performed off-line.

7. A method of pre-processing for website optimization comprising:

a) receiving website source code or web browser code from a website to be optimized;

b) converting said website source code or web browser code into an electronic image;

c) mapping web page elements corresponding to areas in said image;

d) performing saliency analysis on the said image;

e) mapping the results of said saliency analysis to said web page elements;

f) selecting at least one web page for inclusion in a website optimization process based on said saliency analysis;

receiving website optimization process results;

performing secondary saliency analysis on said website optimization process results;

comparing the results of said secondary saliency analysis with a predefined saliency computation model;

in response to comparing the results of said secondary saliency analysis with a predefined saliency computation model, generating discrepancy indicia; and modifying said predefined saliency computation model in response to said discrepancy indicia.

8. The method of claim 7, further comprising:

allocating a saliency result area to a specific section of a web page image according to a predefined mapping rules and according to the overlap of the saliency result area with respect to the specific section; and mapping the saliency of the specific section to a corresponding element of the web page or web browser code.

9. The method of claim 7, wherein the elements are performed off-line.

* * * * *